Patented July 12, 1938

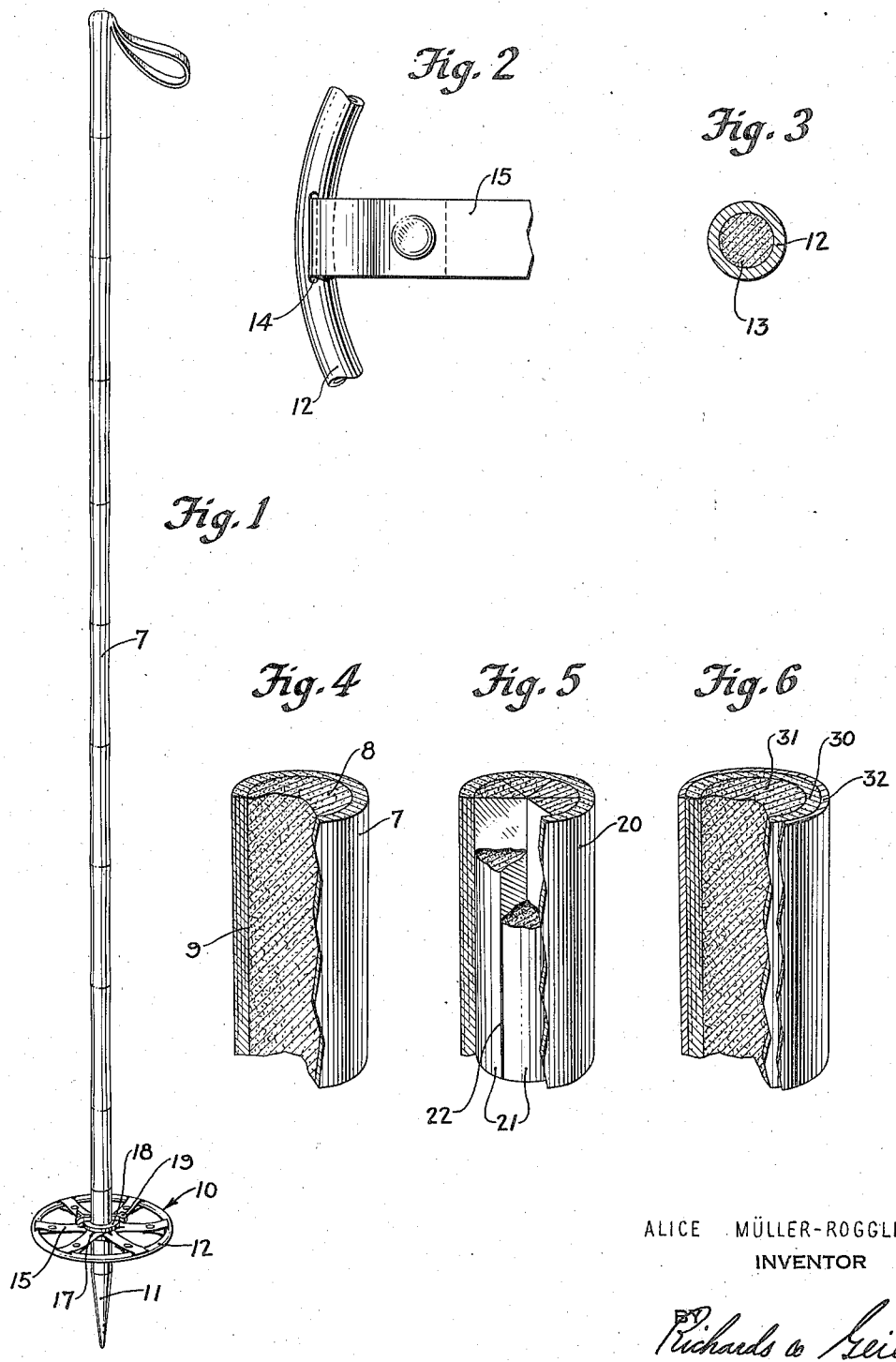

2,123,311

UNITED STATES PATENT OFFICE 2,123,311

SKI-POLE

Alice Müller-Roggli, Thun, Switzerland

Application May 22, 1937, Serial No. 144,155
In France April 9, 1937

3 Claims. (Cl. 280—11.37)

This invention relates to skis, and refers more particularly to a ski-pole of light and sturdy construction and a method of manufacturing the same.

Ski-poles known heretofore break rather easily when bent and cannot withstand rapid changes of temperature to which they are subjected at high altitudes.

An object of the present invention is to eliminate these defects and to provide a ski-pole which is substantially resilient so that it can be easily bent without breakage.

Another object is the provision of a ski-pole which will not split or crack when subjected to rapid variations of temperature.

A further object is the provision of a ski-pole which can be used on high mountains at altitudes of 12,000 to 15,000 feet above sea level and which can be left out-of-doors over night at such high altitudes without cracking or showing any signs of deterioration.

The above and other objects of the present invention may be realized through the provision of a ski-pole comprising a hollow shaft or pole consisting of a fully grown reed or cane which is filled with pith or filling consisting of the same material, said filling being impregnated with a special substance and being glued to the pole. The shaft carries a disc comprising a ring made of anti-corodal and filled with impregnated pith.

The invention will appear more clearly from the following detailed description when taken in connection with the accompanying drawing showing by way of example preferred embodiments of the inventive idea.

In the drawing:

Figure 1 is a perspective view of a ski-pole;

Figure 2 shows on a larger scale a portion of the ring connected to the ski-pole;

Figure 3 is a section through the ring shown in Figures 1 and 2;

Figure 4 shows a portion of the ski-pole illustrated in Figure 1; and

Figures 5 and 6 show portions of ski-poles of somewhat different types.

The ski-pole shown in Figures 1 to 4 of the drawing comprises a rod or pole 7 made of fully grown tonkin or tongking reed or pepper reed. The rod is bored throughout its entire length, care being taken that the hollow bored-out interior of the rod is exactly cylindrical in form and that the axis of the bored-out portion coincides with the axis of the rod.

The filling or pith 8 of the rod 7 is prepared separately. This filling is preferably made of so-called peddig reed, which is the pith of Spanish reed or rotang. The filling is first shaped by the usual means to form a cylinder which is somewhat smaller than the hollow interior of the rod 7. Then the filling 8 is immersed into a liquid consisting of two parts of potassium silicate in one part of water. The filling remains in this liquid for several hour until the liquid gradually penetrates the pores of the reed and until the reed is impregnated entirely with this liquid.

Obviously, any other suitable impregnating process known in the art may be used for the purpose of impregnating the filling, for example, the filling may be treated by vapors of the described liquid.

After the impregnating process has been completed, the filling will expand somewhat, and its outer diameter should be now only slightly smaller than the inner diameter of the hollow pole 7. Then the filling is carefully dried for several hours.

Then the outer surfaces 9 of the filling 8 and/or the inner surfaces of the hollow pole 7 are coated with a specially prepared cold glue. It is important that this cold glue must be used at a certain degree of consistency in order that the material of the filling 8 should be firmly connected with that of the pole 7. As such glue, I prefer to use casein and chalk with sodium phosphate, 1 kg. glue-powder to be stirred up with 2.150 kg. water, until having the consistency of marmalade; the glue must be slaked until it gets thick and flows (not drips) down the spattle.

The filling 8 is introduced into the pole 7 and the glue is allowed to solidify, firmly interconnecting the rod 7 and the filling 8.

The final step of the method of manufacturing the ski-pole is the insertion of the disc 10 and the ferrule 11 upon the lower end of the pole.

The disc 10 comprises a hollow ring 12, which is preferably made of hardened non-corrosive aluminum, known in the trade as "anticorodal". The interior of the ring 12 is filled with a filling 13, which, preferably, consists of peddig reed subjected to the same treatment; namely, the filling 13 is first impregnated with a liquid consisting of two parts of potassium silicate and one part of water, then carefully dried and covered by glue, and finally inserted into the ring 12.

As shown in Figures 1 and 2, the ring 12 preferably comprises six slits or openings 14 to which leather strips 15 are attached. The leather strips 15 are provided with the customary slits 17 through which the pole 7 extends. A metallic ring 18 and a pin 19 are used to keep the disc 10 in position upon the rod 7, the ring 18 being preferably made of a single piece with a ferrule 11. The ferrule 11 which is provided with a sharp point is preferably made of steel.

Figure 5 of the drawing shows a portion of another ski-pole comprising a hollow pole 20, consisting of tonkin reed or pepper reed the interior of which is filled with several pieces 21 of peddig reed which are glued together by the glue 22.

The process of manufacturing this ski-pole is substantially the same as the one already described, namely, the reed pole 20 is carefully bored through, and the pieces 21 are manufactured separately and then impregnated with a liquid consisting of two parts of potassium silicate and one part of water. The impregnated pieces 21 are carefully dried and then glued to each other and to the pole 20 by the glue 22, which may be of the same type as the one already described.

The ski-pole shown in Figure 6 comprises a pole 30 made of tonkin reed or pepper reed and enclosing a pith or filling 31, which may consist of peddig reed. The pole 30 and its filling 31 may be manufactured in the same manner as the pole shown in Figure 4. The outer surface of the pole 30 is coated by a coating or cover 32, which may consist of metal, such as aluminum, or of "celluloid", or of any other suitable material.

The ski-pole manufactured in accordance with the present invention has a remarkably high solidity against splitting and breaking without any noticeable increase in weight, as compared with poles used in the prior art. A ski-pole provided with the described filling may be bent to a large extent without breaking, and after the pressure upon the pole is released, it will unbend itself to the normal straight position. Thus the resiliency and the spring action of the pole are increased to a considerable extent.

While prior art ski-poles split or crack when they are brought into a warm atmosphere after having been previously subjected to low temperatures, the ski-poles manufactured in accordance with the present invention are insensitive to practically any change of temperature, even at high altitudes of 12,000 to 15,000 feet above sea level.

The described ski-poles may be left in the open over night at such altitudes, where the night temperature is often lower than −25° C. and the temperature in the daytime in the sun may be higher than +50° C. In spite of these great changes in temperature, the described ski-poles will not be damaged in any way thereby.

It is apparent that the specific illustrations shown above have been given by way of illustration and not by way of limitation, and that the structures and the methods above described are subject to wide variation and modification without departing from the scope or intent of the invention, all of which variations and modifications are to be included within the scope of the present invention.

What is claimed is:

1. The method of manufacturing a ski-pole, which comprises impregnating a filling consisting of a reed with a liquid consisting of two parts of potassium silicate and one part of water, and gluing the impregnated filling to the interior of a hollow pole consisting of a reed.

2. The method of manufacturing a ski-pole, which comprises impregnating a filling consisting of peddig reed with a liquid consisting of two parts of potassium silicate and one part of water, drying the impregnated filling, providing a pole consisting of a reed having a hollow interior, said filling fitting into said interior, inserting said filling into said interior and simultaneously gluing said filling to said pole.

3. A ski-pole, comprising a hollow pole consisting of a fully grown reed, a reed filling situated within said pole, a ring consisting of "anti-corodal", a filling consisting of peddig reed situated within said ring, and means connecting said ring with said pole.

ALICE MÜLLER-ROGGLI.